US012682919B2

(12) United States Patent
Tanuku et al.

(10) Patent No.: US 12,682,919 B2
(45) Date of Patent: Jul. 14, 2026

(54) SYSTEM AND METHOD FOR REAL-TIME IDENTIFICATION OF DISSATISFACTION DATA

(71) Applicant: JPMorgan Chase Bank, N.A., New York, NY (US)

(72) Inventors: Siva Tanuku, Westerville, OH (US); Matthew Ray, Hilliard, OH (US); Rachel Brinda, Columbus, OH (US); Liping Wu, Westerville, OH (US); Tiffany Wagner, Lewis Center, OH (US); Bhavya Potluri, Delaware, OH (US); Khyati Sinha, Worthington, OH (US); Serdar Kuyuk, Newark, DE (US); Anand P. Joglekar, New Providence, NJ (US); Peter Plantinga, Columbus, OH (US); Kai Ni, Basking Ridge, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 297 days.

(21) Appl. No.: 17/992,269

(22) Filed: Nov. 22, 2022

(65) Prior Publication Data

US 2023/0197105 A1 Jun. 22, 2023

Related U.S. Application Data

(60) Provisional application No. 63/265,878, filed on Dec. 22, 2021.

(51) Int. Cl.
*G10L 25/63* (2013.01)
*G06F 3/16* (2006.01)
(Continued)

(52) U.S. Cl.
CPC .............. *G10L 25/63* (2013.01); *G06F 3/167* (2013.01); *G06F 40/20* (2020.01); *G10L 15/04* (2013.01);
(Continued)

(58) Field of Classification Search
CPC . G06F 3/00; G06F 3/167; G06F 40/00; G06F 40/20; G10L 15/00; G10L 15/04;
(Continued)

(56) References Cited

U.S. PATENT DOCUMENTS 10,841,424 B1 * 11/2020 Lemus ................ H04M 3/5175
11,720,903 B1 * 8/2023 Henryson ............. G06F 16/285
706/11
(Continued)

*Primary Examiner* — Sean E Serraguard
(74) *Attorney, Agent, or Firm* — GREENBLUM & BERNSTEIN, P.L.C.

(57) ABSTRACT

Various methods, apparatuses/systems, and media for automatic real-time identification of dissatisfaction data are disclosed. A receiver receives real-time stream of call transcript data generated during a call or a chat between a customer and an agent. A processor implements a machine learning model that includes predefined complaint data; applies the received call transcript data onto the machine learning model; compares, in response to applying, the call transcript data with predefined complaint data; generates a first similarity score, based on comparing, that identifies how similar the call transcript data is compared to the predefined complaint data; and automatically identifies the call transcript data as a first dissatisfaction data based on determining that the first similarity score is equal to or more than a predetermined threshold value.

14 Claims, 6 Drawing Sheets

100

(51) Int. Cl.

| | |
|---|---|
| *G06F 40/20* | (2020.01) |
| *G10L 15/04* | (2013.01) |
| *G10L 15/06* | (2013.01) |
| *G10L 15/22* | (2006.01) |
| *G10L 15/30* | (2013.01) |

(52) U.S. Cl.
CPC ............ *G10L 15/063* (2013.01); *G10L 15/22* (2013.01); *G10L 15/30* (2013.01)

(58) Field of Classification Search
CPC ....... G10L 15/063; G10L 15/22; G10L 15/30; G10L 25/00; G10L 25/63
See application file for complete search history.

(56) References Cited

U.S. PATENT DOCUMENTS

| | | | | |
|---|---|---|---|---|
| 11,790,411 B1* | 10/2023 | Mann | .................. | G06Q 30/016 704/9 |
| 2019/0251626 A1* | 8/2019 | Jezewski | ................ | G06Q 40/06 |
| 2020/0159778 A1* | 5/2020 | Mohanty | .......... | G06F 16/90332 |
| 2021/0005188 A1* | 1/2021 | Benkreira | ............. | G06N 20/00 |
| 2021/0158234 A1* | 5/2021 | Sivasubramanian | ........................ | H04M 3/5166 |
| 2022/0366197 A1* | 11/2022 | Mazza | .................. | G06F 18/217 |
| 2023/0045930 A1* | 2/2023 | Can | .......................... | G10L 15/08 |
| 2023/0188643 A1* | 6/2023 | Bhattacharya | .......... | G06F 40/56 379/68 |
| 2023/0196020 A1* | 6/2023 | Thoniparambil | ....... | G06F 40/35 704/9 |

\* cited by examiner

200

300

400

600

SYSTEM AND METHOD FOR REAL-TIME IDENTIFICATION OF DISSATISFACTION DATA

CROSS-REFERENCE TO RELATED APPLICATIONS

This application claims the benefit of priority from U.S. Provisional Patent Application No. 63/265,878, filed Dec. 22, 2021, which is herein incorporated by reference in its entirety.

TECHNICAL FIELD

This disclosure generally relates to data processing, and, more particularly, to methods and apparatuses for implementing a dissatisfaction data identification module that may be configured for automatically providing real-time identification of dissatisfaction data based on analyzing real-time received data stream of call transcript data.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Today, a wide variety of business functions are commonly supported by software applications and tools, i.e., business intelligence (BI) tools. For instance, software has been directed to data monitoring, performance analysis, project tracking, and competitive analysis, to name but a few. In general, large enterprises, corporations, agencies, institutions, and other organizations are facing a continuing problem of handling, processing, and/or accurately describing a vast amount of data, i.e., call transcript data between a customer and an agent, that are crucial to plan actions at store level or market/regional level in an efficient and expedited manner.

However, today's conventional tools lack configuration for automatically providing real-time identification of dissatisfaction data (i.e., customer complaint data) based on analyzing real-time received data stream of call transcript data. Conventional tools may only provide manual identification of complaints resulting in unnecessary escalations as well as resulting in inferior quality and consistency issues.

Thus, there is a need for an advanced data identification tool that can address these conventional shortcomings.

SUMMARY

The present disclosure, through one or more of its various aspects, embodiments, and/or specific features or sub-components, provides, among other features, various systems, servers, devices, methods, media, programs, and platforms for implementing a platform and language agnostic dissatisfaction data identification module that may be configured for automatically providing real-time identification of dissatisfaction data based on analyzing real-time received data stream of call transcript data, but the disclosure is not limited thereto.

For example, the present disclosure, through one or more of its various aspects, embodiments, and/or specific features or sub-components, may also provide, among other features, various systems, servers, devices, methods, media, programs, and platforms for implementing a platform and language agnostic dissatisfaction data identification module that may be configured for implementing machine learning algorithm to identify customer complaints data in real time while the customer is talking or chatting to agents to alleviate burden on agents, improve accuracy and achieve greater customer satisfaction, but the disclosure is not limited thereto.

According to an aspect of the present disclosure, a method for automatic real-time identification of dissatisfaction data (i.e., customer complaint data) by utilizing one or more processors along with allocated memory is disclosed. The method may include: establishing a communication link between an application and a cloud platform deployed on a cloud environment, the application including a service layer module, an interface layer module, and a user interface (UI) layer module; receiving, by the service layer module, real-time stream of call transcript data generated during a call or a chat between a customer and an agent; calling an application programming interface (API) to invoke the interface layer module to consume the real-time stream of the call transcript data as input data outputted from the service layer module; implementing a machine learning model that includes predefined complaint data; applying the call transcript data onto the machine learning model; comparing, in response to applying, the call transcript data with predefined complaint data; generating a first similarity score, based on comparing, that identifies how similar the call transcript data is compared to the predefined complaint data; and automatically identifying the call transcript data as a first dissatisfaction data based on determining that the first similarity score is equal to or more than a predetermined threshold value.

According to yet another aspect of the instant disclosure, the call transcript data may include real-time stream of voice data received from a telephony device, and the method may further include: converting the voice data into text data; and applying the text data onto the machine learning model.

According to a further aspect of the instant disclosure, the call transcript data may include real-time stream of text data received from a chat platform, and the method may further include: generating text data from the call transcript data; and applying the text data onto the machine learning model.

According to an additional aspect of the instant disclosure, the method may further include: training the machine learning model with the first dissatisfaction data for automatic identification of a second dissatisfaction data and automatic identification of a second similarity score when a new call transcript data is received by the service layer module during a new call between the customer and the agent.

According to yet another aspect of the instant disclosure, in generating the call transcript data in real-time, the method may further include: concatenating all utterances during the call between the customer and the agent; converting the utterances into text data; and applying the text data onto the machine learning model.

According to a further aspect of the instant disclosure, the machine learning model includes one or more of the following models: a natural language processing (NLP) model and a long short term memory (LSTM) model, but the disclosure is not limited thereto. For example the machine learning model may further include container network modeling for NLP.

According to another aspect of the instant disclosure, the method may further include: storing output from the machine learning model onto a database.

According to an additional aspect of the instant disclosure, the method may further include: automatically generating suggestions data based on the dissatisfaction data to resolve issues raised by the customer; and calling an API to invoke the UI interface layer module to display the suggestions data onto display screen of an agent computing device utilized by the agent.

According to yet another aspect of the instant disclosure, the suggestions data may include one or more of the following data: complaint data; policy data; types of complaint data; sub-types of complaint data; and de-escalation script data but the disclosure is not limited thereto.

According to a further aspect of the instant disclosure, the method may further include: receiving agent feedback data on the complaint data from the agent's computing device; storing the agent feedback data onto a database; and consuming the agent feedback data by an analyst computing device utilized by an analyst.

According to another aspect of the instant disclosure, the method may further include: training the machine learning model by applying the agent feedback data onto the machine learning model; receiving, by the service layer module, a new call or a new chat between the customer and the agent; implementing the trained machine learning model; comparing, in response to implementing, the new call transcript data with the predefined complaint data; generating a second similarity score, based on comparing, that identifies how similar the new call transcript data is compared to the predefined complaint data; and automatically identifying the new call transcript data as a second dissatisfaction data based on determining that the second similarity score is equal to or more than the predetermined threshold value.

According to a further aspect of the present disclosure, the predefined complaint data may include historical logs of complaint data within an organization along with complaint data accessed from public database of complaints, and the method may further include: training the machine learning model with the predefined complaint data.

According to an aspect of the present disclosure, a system for automatic real-time identification of dissatisfaction data is disclosed. The system may include: a processor; and a memory operatively connected to the processor via a communication interface, the memory storing computer readable instructions, when executed, may cause the processor to: establish a communication link between an application and a cloud platform deployed on a cloud environment, the application including a service layer module, an interface layer module, and a user interface (UI) layer module; cause the service layer module to receive real-time stream of call transcript data generated during a call or a chat between a customer and an agent; call an application programming interface (API) to invoke the interface layer module to consume the real-time stream of the call transcript data as input data outputted from the service layer module; implement a machine learning model that includes predefined complaint data; apply the call transcript data onto the machine learning model; compare, in response to applying, the call transcript data with predefined complaint data; generate a first similarity score, based on comparing, that identifies how similar the call transcript data is compared to the predefined complaint data; and automatically identify the call transcript data as a first dissatisfaction data based on determining that the first similarity score is equal to or more than a predetermined threshold value.

According to yet another aspect of the instant disclosure, the call transcript data may include real-time stream of voice data received from a telephony device, and the processor may be further configured to: convert the voice data into text data; and apply the text data onto the machine learning model.

According to a further aspect of the instant disclosure, the call transcript data may include real-time stream of text data received from a chat platform, and the processor may be further configured to: generate text data from the call transcript data; and apply the text data onto the machine learning model.

According to an additional aspect of the instant disclosure, the processor may be further configured to: train the machine learning model with the first dissatisfaction data for automatic identification of a second dissatisfaction data and automatic identification of a second similarity score when a new call transcript data is received by the service layer module during a new call between the customer and the agent.

According to yet another aspect of the instant disclosure, in generating the call transcript data in real-time, the processor may be further configured to: concatenate all utterances during the call between the customer and the agent; convert the utterances into text data; and apply the text data onto the machine learning model.

According to a further aspect of the instant disclosure, the processor may be further configured to store output from the machine learning model onto a database.

According to an additional aspect of the instant disclosure, the processor may be further configured to: automatically generate suggestions data based on the dissatisfaction data to resolve issues raised by the customer; and call an API to invoke the UI interface layer module to display the suggestions data onto display screen of an agent computing device utilized by the agent.

According to a further aspect of the instant disclosure, the processor may be further configured to: receive agent feedback data on the complaint data from the agent's computing device; store the agent feedback data onto a database; and consume the agent feedback data by an analyst computing device utilized by an analyst.

According to another aspect of the instant disclosure, the processor may be further configured to: train the machine learning model by applying the agent feedback data onto the machine learning model; receive, by the service layer module, a new call or a new chat between the customer and the agent; implement the trained machine learning model; compare, in response to implementing, the new call transcript data with the predefined complaint data; generate a second similarity score, based on comparing, that identifies how similar the new call transcript data is compared to the predefined complaint data; and automatically identify the new call transcript data as a second dissatisfaction data based on determining that the second similarity score is equal to or more than the predetermined threshold value.

According to a further aspect of the present disclosure, the predefined complaint data may include historical logs of complaint data within an organization along with complaint data accessed from public database of complaints, and the processor may be further configured to: train the machine learning model with the predefined complaint data.

According to yet another aspect of the present disclosure, a non-transitory computer readable medium configured to store instructions for automatic real-time identification of dissatisfaction data is disclosed. The instructions, when executed, may cause a processor to perform the following: establishing a communication link between an application and a cloud platform deployed on a cloud environment, the application including a service layer module, an interface layer module, and a user interface (UI) layer module; receiving, by the service layer module, real-time stream of call transcript data generated during a call or a chat between a customer and an agent; calling an application programming interface (API) to invoke the interface layer module to consume the real-time stream of the call transcript data as input data outputted from the service layer module; implementing a machine learning model that includes predefined complaint data; applying the call transcript data onto the machine learning model; comparing, in response to applying, the call transcript data with predefined complaint data; generating a first similarity score, based on comparing, that identifies how similar the call transcript data is compared to the predefined complaint data; and automatically identifying the call transcript data as a first dissatisfaction data based on determining that the first similarity score is equal to or more than a predetermined threshold value.

According to another aspect of the instant disclosure, the call transcript data may include real-time stream of voice data received from a telephony device, and the instructions, when executed, may cause the processor to perform the following: converting the voice data into text data; and applying the text data onto the machine learning model.

According to a further aspect of the instant disclosure, the call transcript data may include real-time stream of text data received from a chat platform, and the instructions, when executed, may cause the processor to perform the following: generating text data from the call transcript data; and applying the text data onto the machine learning model.

According to an additional aspect of the instant disclosure, the instructions, when executed, may cause the processor to perform the following: training the machine learning model with the first dissatisfaction data for automatic identification of a second dissatisfaction data and automatic identification of a second similarity score when a new call transcript data is received by the service layer module during a new call between the customer and the agent.

According to yet another aspect of the instant disclosure, in generating the call transcript data in real-time, the instructions, when executed, may cause the processor to perform the following: concatenating all utterances during the call between the customer and the agent; converting the utterances into text data; and applying the text data onto the machine learning model.

According to another aspect of the instant disclosure, the instructions, when executed, may cause the processor to perform the following: storing output from the machine learning model onto a database.

According to an additional aspect of the instant disclosure, the instructions, when executed, may cause the processor to perform the following: automatically generating suggestions data based on the dissatisfaction data to resolve issues raised by the customer; and calling an API to invoke the UI interface layer module to display the suggestions data onto display screen of an agent computing device utilized by the agent.

According to a further aspect of the instant disclosure, the instructions, when executed, may cause the processor to perform the following: receiving agent feedback data on the complaint data from the agent's computing device; storing the agent feedback data onto a database; and consuming the agent feedback data by an analyst computing device utilized by an analyst.

According to another aspect of the instant disclosure, the instructions, when executed, may cause the processor to perform the following: training the machine learning model by applying the agent feedback data onto the machine learning model; receiving, by the service layer module, a new call or a new chat between the customer and the agent; implementing the trained machine learning model; comparing, in response to implementing, the new call transcript data with the predefined complaint data; generating a second similarity score, based on comparing, that identifies how similar the new call transcript data is compared to the predefined complaint data; and automatically identifying the new call transcript data as a second dissatisfaction data based on determining that the second similarity score is equal to or more than the predetermined threshold value.

According to a further aspect of the present disclosure, the predefined complaint data may include historical logs of complaint data within an organization along with complaint data accessed from public database of complaints, and the instructions, when executed, may cause the processor to perform the following: training the machine learning model with the predefined complaint data.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
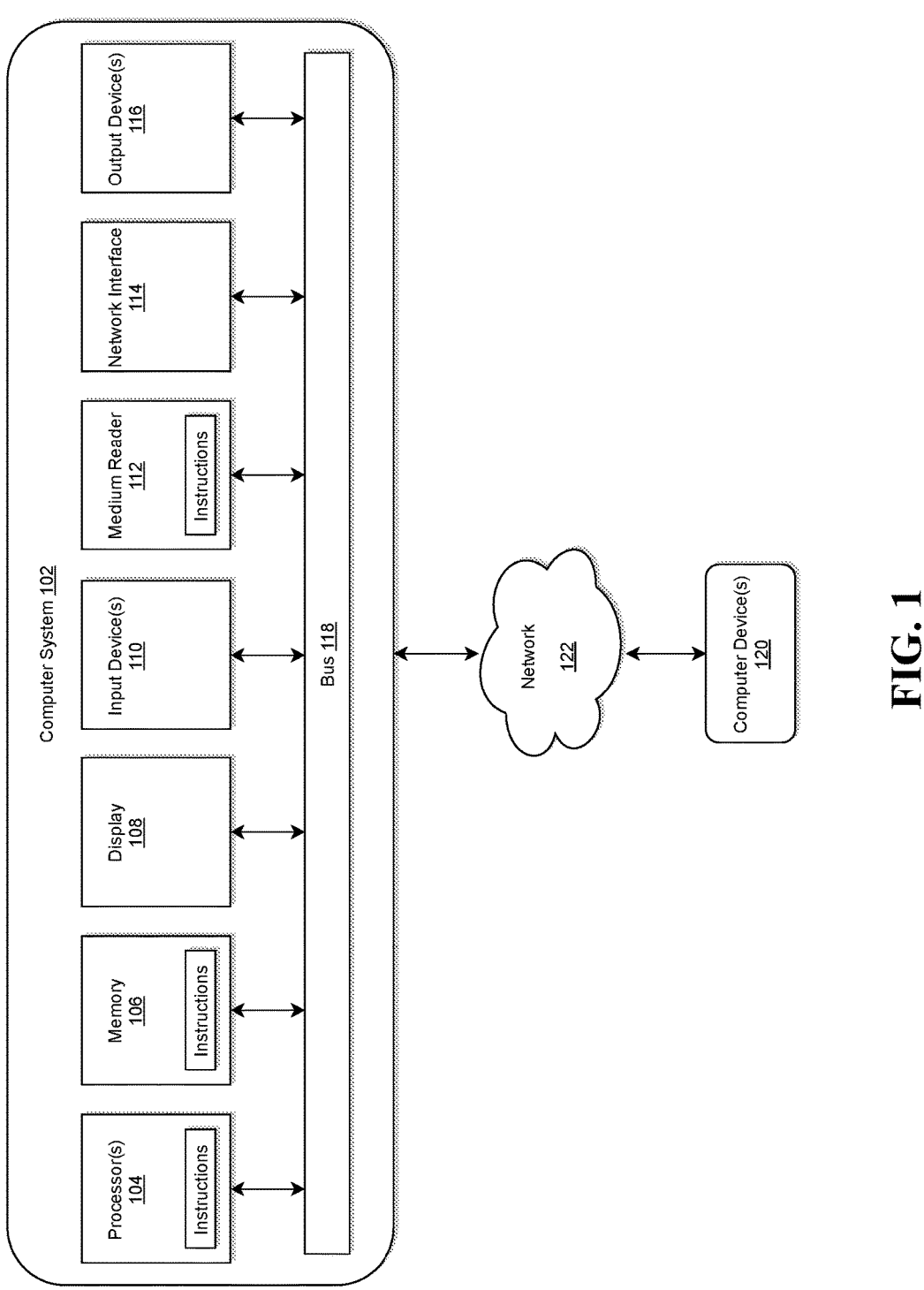
FIG. 1 illustrates a computer system for implementing a platform and language agnostic dissatisfaction data identification module that may be configured for automatically providing real-time identification of dissatisfaction data based on analyzing real-time received data stream of call transcript data in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system 100 for use in implementing a platform and language agnostic dissatisfaction data identification module that may be configured for automatically providing real-time identification of dissatisfaction data based on analyzing real-time received data stream of call transcript data in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

According to exemplary embodiments, the dissatisfaction data identification module may be platform and language agnostic that may allow for consistent easy orchestration and passing of data through various components to output a desired result. Since the disclosed process, according to exemplary embodiments, is platform and language agnostic, the dissatisfaction data identification module may be independently tuned or modified for optimal performance without affecting the configuration or data files. The configuration or data files, according to exemplary embodiments, may be written using JSON, but the disclosure is not limited thereto. For example, the configuration or data files may easily be extended to other readable file formats such as XML, YAML, etc., or any other configuration based languages.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
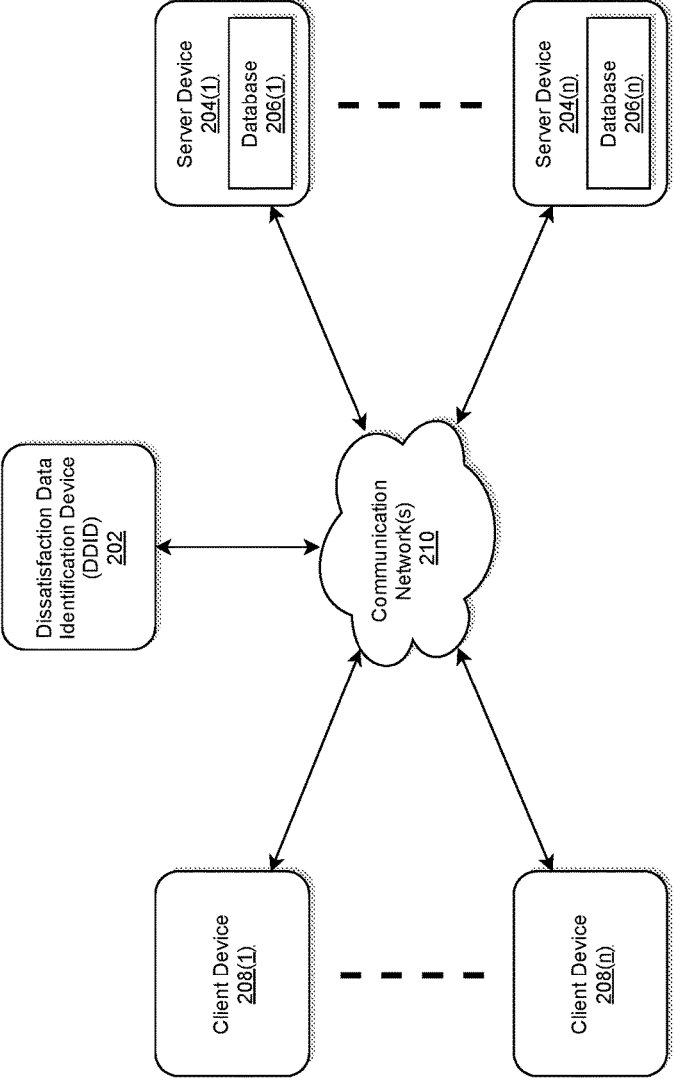
FIG. 2 illustrates an exemplary diagram of a network environment with a platform and language agnostic dissatisfaction data identification device in accordance with an exemplary embodiment.

Referring to FIG. 2, a schematic of an exemplary network environment 200 for implementing a platform and language dissatisfaction data identification device (DDID) of the instant disclosure is illustrated.

According to exemplary embodiments, the above-described problems associated with conventional tools may be overcome by implementing a DDID 202 as illustrated in FIG. 2 that may be configured for automatically providing real-time identification of dissatisfaction data based on analyzing real-time received data stream of call transcript data, but the disclosure is not limited thereto. For example, according to exemplary embodiments, the above-described problems associated with conventional tools may be overcome by implementing a DDID 202 as illustrated in FIG. 2 that may be configured for implementing machine learning algorithm to identify customer complaints data in real time while the customer is talking or chatting to agents to alleviate burden on agents, improve accuracy and achieve greater customer satisfaction, but the disclosure is not limited thereto.

The DDID 202 may be the same or similar to the computer system 102 as described with respect to FIG. 1.

The DDID 202 may store one or more applications that can include executable instructions that, when executed by the DDID 202, cause the DDID 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DDID 202 itself, may be located in virtual server(s) running in a cloud-based computing environment rather than being tied to one or more specific physical network computing devices. Also, the application(s) may be running in one or more virtual machines (VMs) executing on the DDID 202. Additionally, in one or more embodiments of this technology, virtual machine(s) running on the DDID 202 may be managed or supervised by a hypervisor.

In the network environment 200 of FIG. 2, the DDID 202 is coupled to a plurality of server devices 204(1)-204(n) that hosts a plurality of databases 206(1)-206(n), and also to a plurality of client devices 208(1)-208(n) via communication network(s) 210. A communication interface of the DDID 202, such as the network interface 114 of the computer system 102 of FIG. 1, operatively couples and communicates between the DDID 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DDID 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DDID 202 may be a standalone device or integrated with one or more other devices or apparatuses, such as one or more of the server devices 204(1)-204(n), for example. In one particular example, the DDID 202 may be hosted by one of the server devices 204(1)-204(n), and other arrangements are also possible. Moreover, one or more of the devices of the DDID 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DDID 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the DDID 202 that may efficiently provide a platform for implementing a platform and language agnostic dissatisfaction data identification module that may be configured for automatically providing real-time identification of dissatisfaction data based on analyzing real-time received data stream of call transcript data, but the disclosure is not limited thereto. For example, according to exemplary embodiments, the client devices 208(1)-208(n) in this example may include any type of computing device that can facilitate the implementation of the DDID 202 that may efficiently provide a platform for implementing a platform and language agnostic dissatisfaction data identification module that may be configured for implementing machine learning algorithm to identify customer complaints data in real time while the customer is talking or chatting to agents to alleviate burden on agents, improve accuracy and achieve greater customer satisfaction, but the disclosure is not limited thereto.

The client devices 208(1)-208(n) may run interface applications, such as standard web browsers or standalone client applications, which may provide an interface to communicate with the DDID 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the DDID 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DDID 202, the server devices 204(1)-204(n), or the client devices 208(1)-208(n), for example, may be configured to operate as virtual instances on the same physical machine. For example, one or more of the DDID 202, the server devices 204(1)-204(n), or the client devices 208(1)-208(n) may operate on the same physical device rather than as separate devices communicating through communication network(s) 210. Additionally, there may be more or fewer DDIDs 202, server devices 204(1)-204(n), or client devices 208(1)-208(n) than illustrated in FIG. 2. According to exemplary embodiments, the DDID 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
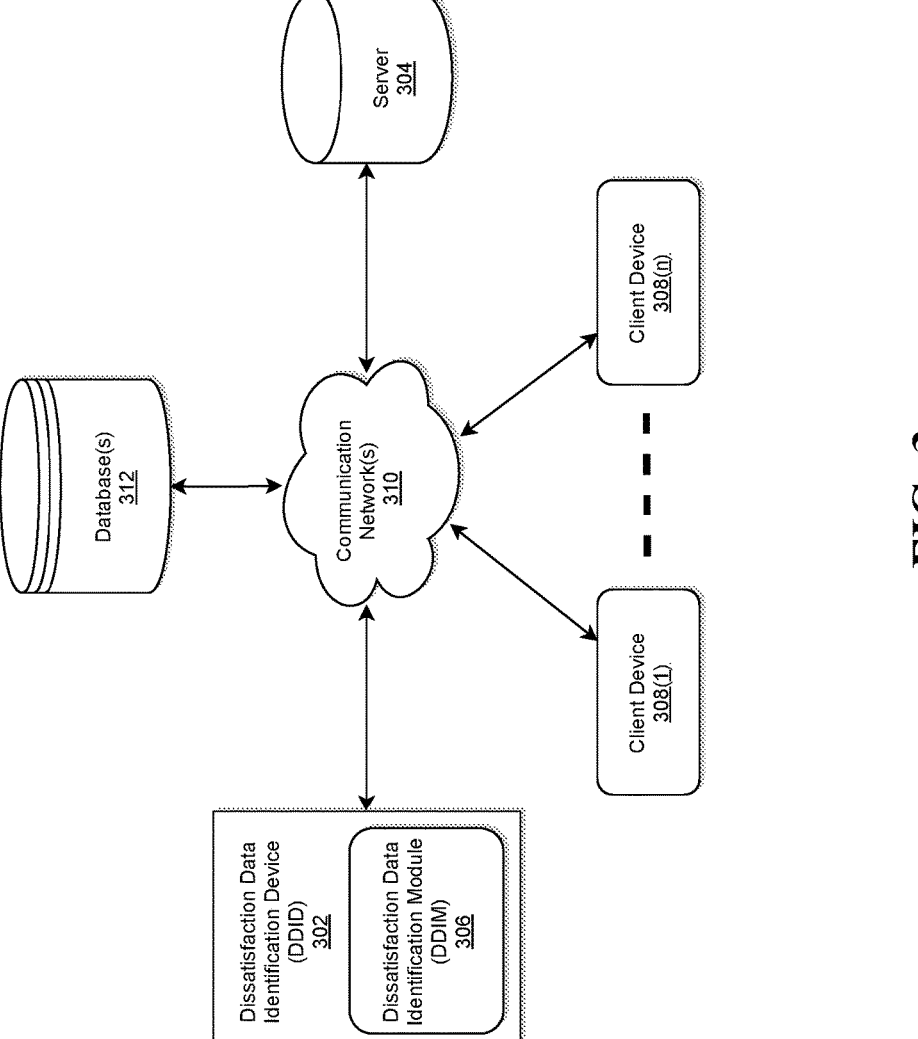
FIG. 3 illustrates a system diagram for implementing a platform and language agnostic dissatisfaction data identification device having a platform and language agnostic dissatisfaction data identification module in accordance with an exemplary embodiment.

FIG. 3 illustrates a system diagram for implementing a DDID having a platform and language agnostic dissatisfaction data identification module (DDIM) in accordance with an exemplary embodiment.

As illustrated in FIG. 3, the system 300 may include a DDID 302 within which a DDIM 306 is embedded, a server 304, a database(s) 312, a plurality of client devices 308(1) . . . 308(n), and a communication network 310.

According to exemplary embodiments, the DDID 302 including the DDIM 306 may be connected to the server 304, and the database(s) 312 via the communication network 310. The DDID 302 may also be connected to the plurality of client devices 308(1) . . . 308(n) via the communication network 310, but the disclosure is not limited thereto.

According to exemplary embodiment, the DDID 302 is described and shown in FIG. 3 as including the DDIM 306, although it may include other rules, policies, modules, databases, or applications, for example. According to exemplary embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein. The database(s) may be a mainframe database, a log database that may that may produce programming for searching, monitoring, and analyzing machine-generated data via a web interface, etc., but the disclosure is not limited thereto.

According to exemplary embodiments, the DDIM 306 may be configured to receive real-time feed of data from the plurality of client devices 308(1) . . . 308(n) via the communication network 310.

As will be described below, the DDIM 306 may be configured to: establish a communication link between an application and a cloud platform deployed on a cloud environment, the application including a service layer module, an interface layer module, and a user interface (UI) layer module; cause the service layer module to receive real-time stream of call transcript data generated during a call or a chat between a customer and an agent; call an application programming interface (API) to invoke the interface layer module to consume the real-time stream of the call transcript data as input data outputted from the service layer module; implement a machine learning model that includes predefined complaint data; apply the call transcript data onto the machine learning model; compare, in response to applying, the call transcript data with predefined complaint data; generate a first similarity score, based on comparing, that identifies how similar the call transcript data is compared to the predefined complaint data; and automatically identify the call transcript data as a first dissatisfaction data based on determining that the first similarity score is equal to or more than a predetermined threshold value, but the disclosure is not limited thereto.

The plurality of client devices 308(1) . . . 308(n) are illustrated as being in communication with the DDID 302. In this regard, the plurality of client devices 308(1) . . . 308(n) may be "clients" (e.g., customers) of the DDID 302 and are described herein as such. Nevertheless, it is to be known and understood that the plurality of client devices 308(1) . . . 308(n) need not necessarily be "clients" of the DDID 302, or any entity described in association therewith herein. Any additional or alternative relationship may exist between either or both of the plurality of client devices 308(1) . . . 308(n) and the DDID 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the DDID 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The DDID 302 may be the same or similar to the DDID 202 as described with respect to FIG. 2, including any features or combination of features described with respect thereto.

Figure 4:
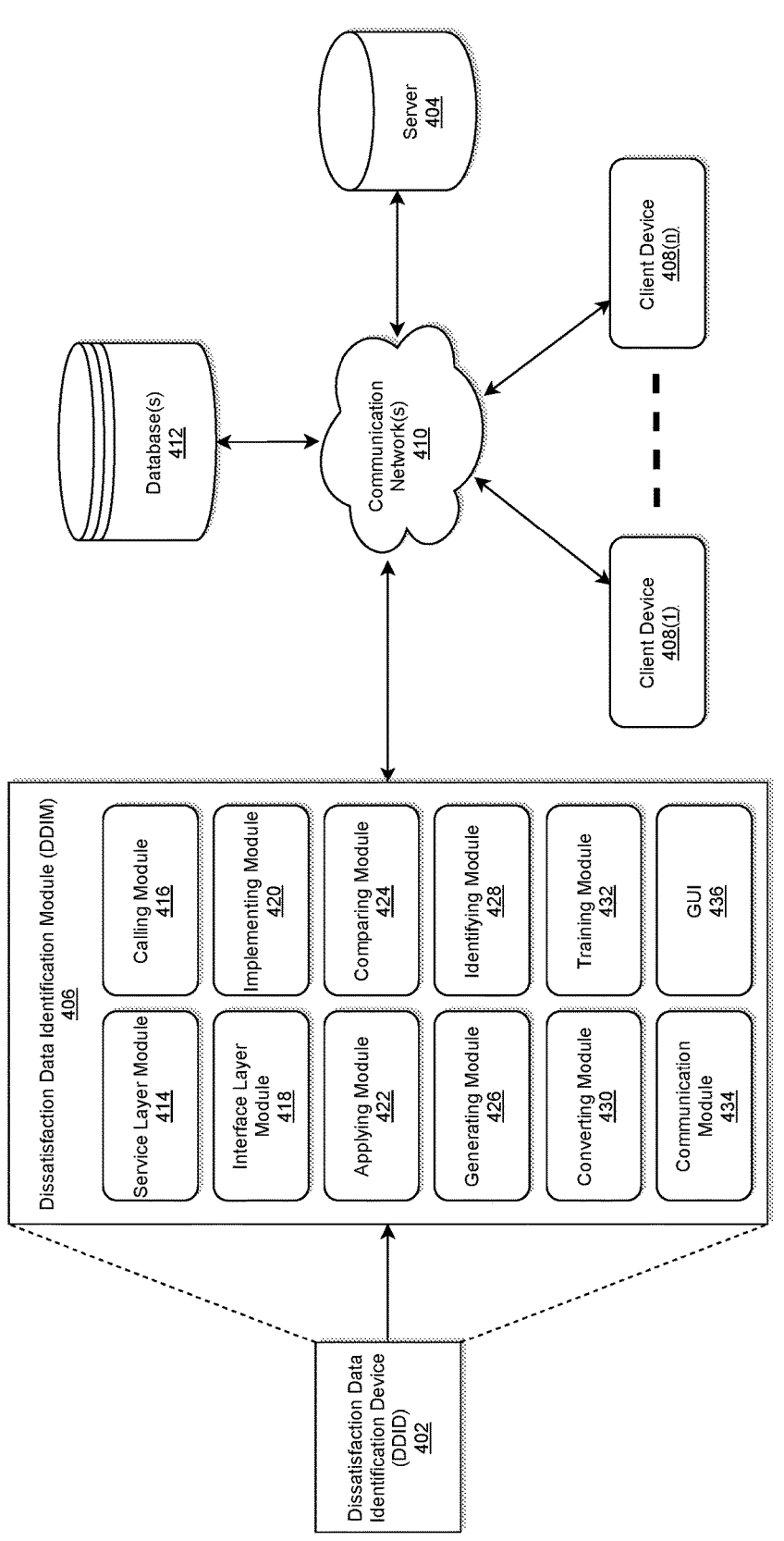
FIG. 4 illustrates a system diagram for implementing a platform and language agnostic dissatisfaction data identification module of FIG. 3 in accordance with an exemplary embodiment.

FIG. 4 illustrates a system diagram for implementing a DDIM of FIG. 3 in accordance with an exemplary embodiment.

According to exemplary embodiments, the system 400 may include a platform and language agnostic DDID 402 within which a platform and language agnostic DDIM 406 is embedded, a server 404, database(s) 412, and a communication network 410.

According to exemplary embodiments, the DDID 402 including the DDIM 406 may be connected to the server 404 and the database(s) 412 via the communication network 410. The DDID 402 may also be connected to the plurality of client devices 408(1)-408(n) via the communication network 410, but the disclosure is not limited thereto. The DDIM 406, the server 404, the plurality of client devices 408(1)-408(n), the database(s) 412, the communication network 410 as illustrated in FIG. 4 may be the same or similar to the DDIM 306, the server 304, the plurality of client devices 308(1)-308(n), the database(s) 312, the communication network 310, respectively, as illustrated in FIG. 3. According to exemplary embodiments, the client devices 408(1)-408(n) may be operatively connected to a telephony device (not shown) or a chat platform (not shown) to receive voice data or chat data, respectively, but the disclosure is not limited thereto. For example, the DDIM 406 may be configured to receive any form of communication data from any form of communication platform between a customer and an agent.

According to exemplary embodiments, as illustrated in FIG. 4, the DDIM 406 may include a service layer module 414, a calling module 416, an interface layer module 418, an implementing module 420, an applying module 422, a comparing module 424, a generating module 426, an identifying module 428, a converting module 430, a training module 432, a communication module 434, and a GUI 436. According to exemplary embodiments, the GUI 436 may also be referred to as UI layer module. Also, according to exemplary embodiments the service layer module 414, the interface layer module 418, and the UI layer module (i.e., GUI 436) may be component of an application as disclosed in FIG. 5.

According to exemplary embodiments, each of the service layer module 414, calling module 416, interface layer module 418, implementing module 420, applying module 422, comparing module 424, generating module 426, identifying module 428, converting module 430, training module 432, and the communication module 434 of the DDIM 406 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the service layer module 414, calling module 416, interface layer module 418, implementing module 420, applying module 422, comparing module 424, generating module 426, identifying module 428, converting module 430, training module 432, and the communication module 434 of the DDIM 406 may be implemented by microprocessors or similar, and may be programmed using software (e.g., microcode) to perform various functions discussed herein and may optionally be driven by firmware and/or software.

Alternatively, according to exemplary embodiments, each of the service layer module 414, calling module 416, interface layer module 418, implementing module 420, applying module 422, comparing module 424, generating module 426, identifying module 428, converting module 430, training module 432, and the communication module 434 of the DDIM 406 may be implemented by dedicated hardware, or as a combination of dedicated hardware to perform some functions and a processor (e.g., one or more programmed microprocessors and associated circuitry) to perform other functions.

According to exemplary embodiments, each of the service layer module 414, calling module 416, interface layer module 418, implementing module 420, applying module 422, comparing module 424, generating module 426, identifying module 428, converting module 430, training module 432, and the communication module 434 of the DDIM 406 may be called via corresponding API.

The process may be executed via the communication module 434 and the communication network 410, which may comprise plural networks as described above. For example, in an exemplary embodiment, the various components of the DDIM 406 may communicate with the server 404, and the database(s) 412 via the communication module 434 and the communication network 410. Of course, these embodiments are merely exemplary and are not limiting or exhaustive.

Figure 5:
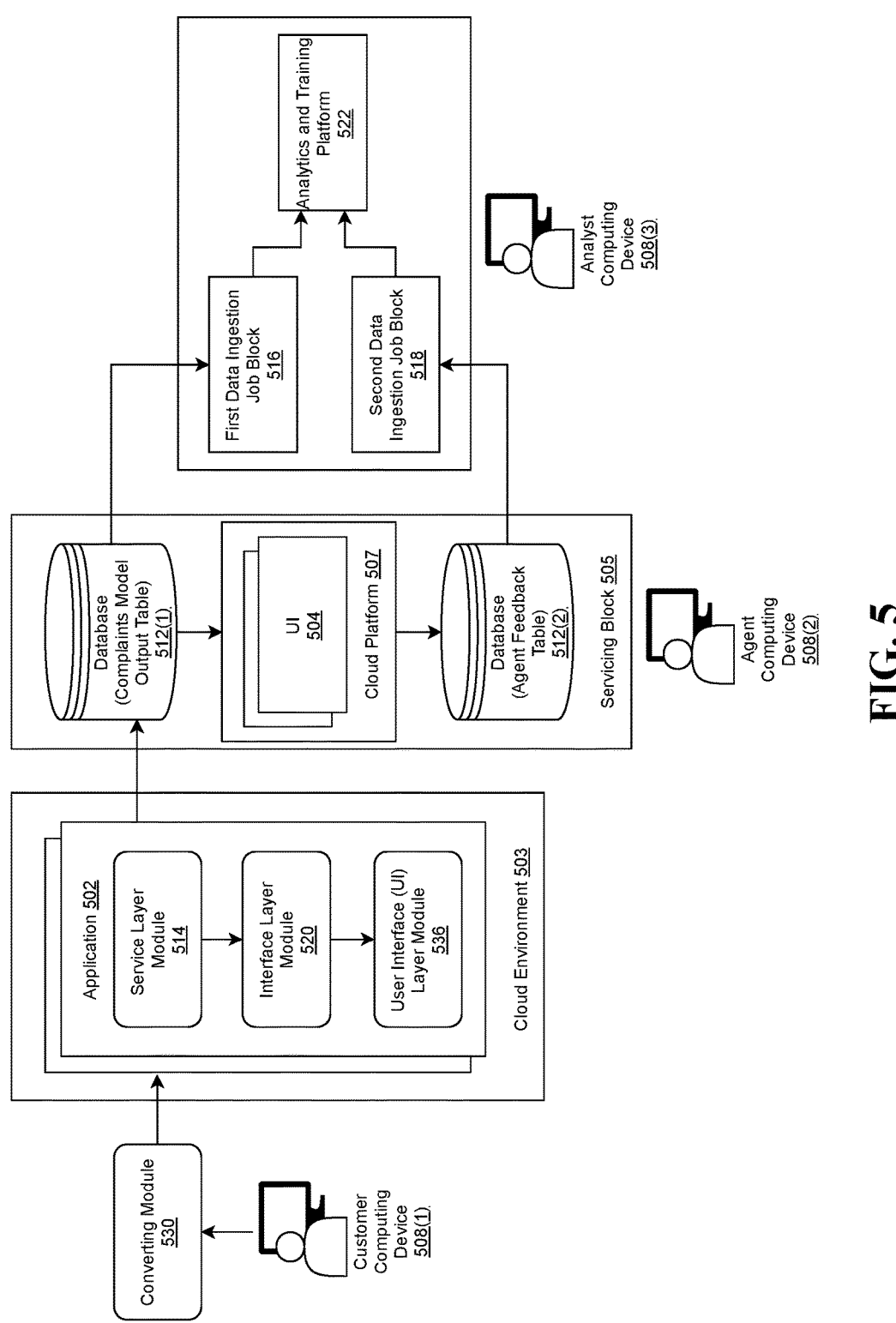
FIG. 5 illustrates an exemplary architecture implemented by the platform and language agnostic dissatisfaction data identification module of FIG. 4 in accordance with an exemplary embodiment.

FIG. 5 illustrates an exemplary architecture 500 implemented by the platform and language agnostic DDIM 406 of FIG. 4 in accordance with an exemplary embodiment. As illustrated in FIG. 5, a converting module 530 may receive real-time voice data or chat data from a customer via a customer computing device 508(1) during a call or a chat between a customer and an agent who is utilizing an agent computing device 508(2).

According to exemplary embodiments, the converting module 530 may be operatively connected to an application 502 deployed on a cloud environment 503. The application 502 may include at least a service layer module 514, an interface layer module 520, and a UI layer module 536, but the disclosure is not limited thereto.

According to exemplary embodiments, the application 502 may be operatively connected to a servicing block 505 that may include a database 512(1) that may store complaints model output table, a UI 504 on a cloud platform 507, and another database 512(2) that may store agent feedback table.

According to exemplary embodiments, the servicing block 505 may be operatively connected to an analyst computing device 508(3) that may support a first data ingestion job block 516, a second data ingestion job block 518 and an analytics and training platform 522, but the disclosure is not limited thereto. Data from the database 512(1) may flow to the first data ingestion job block 516, which then may flow to the analytics and training platform 522. Data from the database 512(2) may flow to the second data ingestion job block 518, which then may flow to the analytics and training platform 522.

Referring to FIGS. 4 and 5, according to exemplary embodiments, the DDIM 406 along with the application 502 describe the overall flow of real-time identification of customer dissatisfaction data and provide information necessary to support the applications in production.

According to exemplary embodiments, the three separate modules—the service layer module 414, 514, the interface layer module 418, 520, and the UI layer module 536, may be hosted on cloud platform (i.e., Kubernetes platform, but the disclosure is not limited thereto).

According to exemplary embodiments, the service layer module 414, 514 may receive a stream (in real-time) of customer/agent call transcript data and may feed that to the interface layer module 418, 520. The interface layer module 418, 520 may consume the transcription data as input, and outputs predictions about the customer's dissatisfaction. At the same time a flag may be raised on the specialist's UI layer module 536) (i.e., agent's UI or analyst's UI) to trigger more actions.

For example, referring back to FIGS. 4 and 5, the communication module 434 may be configured to establish a communication link between the application 502 and a cloud platform deployed on a cloud environment 503. The service layer module 414, 514 may be configured to receive real-time stream of call transcript data generated during a call or a chat between a customer (utilizing customer computing device 408(1)) and an agent (utilizing agent computing device 408(2). The calling module 416 may be configured to call an API to invoke the interface layer module 418, 520 to consume the real-time stream of the call transcript data as input data outputted from the service layer module 414, 514. The implementing module 420 may be configured to implement a machine learning model that includes predefined complaint data. The applying module 422 may be configured to apply the call transcript data onto the machine learning model. The comparing module 424 may be configured to compare, in response to applying, the call transcript data with predefined complaint data. The generating module 426 may be configured to generate a first similarity score, based on comparing, that identifies how similar the call transcript data is compared to the predefined complaint data. The identifying module 428 may be configured to automatically identifying the call transcript data as a first dissatisfaction data based on determining that the first similarity score is equal to or more than a predetermined threshold value.

According to exemplary embodiments, the predetermined threshold value may be a value that represents 80% match between the call transcript data and the predefined complaint data, but the disclosure is not limited thereto. For example, the predetermined threshold value may be set as a value that represents any desired percentage of match (i.e., 70%-100%) between the call transcript data and the predefined complaint data, but the disclosure is not limited thereto.

According to exemplary embodiments, the call transcript data may include real-time stream of voice data received from a telephony device, and the converting module 430, 530 may be configured to convert the voice data into text data, and the applying module 422 may be configured to apply the text data onto the machine learning model. According to exemplary embodiments, the machine learning model may include one or more of the following models: a natural language processing (NLP) model and a long short term memory (LSTM) model, but the disclosure is not limited thereto. For example the machine learning model may further include container network modeling for NLP.

According to exemplary embodiments, the DDIM 406 may be configured to store output from the machine learning model onto the database 412(1).

According to exemplary embodiments, the call transcript data may include real-time stream of text data received from a chat platform, and the generating module 426 may be configured to generate text data from the call transcript data; and the applying module 422 may be configured to apply the text data onto the machine learning model.

According to exemplary embodiments, the training module 432 may be configured to train the machine learning model with the first dissatisfaction data for automatic identification of a second dissatisfaction data and automatic identification of a second similarity score when a new call transcript data is received by the service layer module 414, 514 during a new call between the customer and the agent.

According to exemplary embodiments, in generating the call transcript data in real-time, the generating module 426 may be configured to concatenate all utterances during the call between the customer and the agent; and the converting module 430 may be configured to convert the utterances into text data; and the applying module 422 may be configured to apply the text data onto the machine learning model.

According to exemplary embodiments, the generating module 426 may be configured to automatically generate suggestions data based on the dissatisfaction data to resolve issues raised by the customer; and the calling module 416 may be configured to call an API to invoke the UI interface layer module 536 to display the suggestions data onto display screen of an agent computing device 508(2) utilized by the agent. According to exemplary embodiments, the suggestions data may include one or more of the following data: complaint data; policy data; types of complaint data; sub-types of complaint data; and de-escalation script data but the disclosure is not limited thereto.

According to exemplary embodiments, the DDIM 406 may be configured to receive complaints model output table from the database 512(1). The complaints model output table may be consumed by the analyst computing device 508(3) utilized by an analyst. For example, the first data injection job block 516 may pull the complaints model output table from the database 512(1) and store onto a distributed file system (i.e., Hadoop). The analytics and training platform 522 may receive the data from the first data injection job block 516 and may create a view in the analyst's computing device 508(3) (i.e., Apache Hive).

According to exemplary embodiments, the DDIM 406 may be configured to receive agent feedback data on the complaint data from the agent's computing device 508(2); and store the agent feedback data onto the database 512(2). The agent feedback data may be consumed by the analyst computing device 508(3) utilized by an analyst. For example, the second data injection job block 518 may pull the agent feedback data (i.e., agent feedback table) from the database 512(2) and store onto the distributed file system (i.e., Hadoop). The analytics and training platform 522 may receive the data from the second data injection job block 518 and may create a view in the analyst's computing device 508(3) (i.e., Apache Hive).

According to exemplary embodiments, the predefined complaint data may include historical logs of complaint data within an organization along with complaint data accessed from public database of complaints, and the training module 432 may be configured to train the machine learning model with the predefined complaint data. The DDIM 406 then may store the model output onto the database 512(1).

According to exemplary embodiments, the training module 432 may further be configure to train the machine learning model by applying the agent feedback data onto the machine learning model received from the database 512(2).

When a new call or a new chat is made between and customer and an agent, the service layer module 414, 514 maybe configured to receive the new call or a new chat between the customer and the agent; the implementing module 420 may be configured to implement the trained machine learning model; the comparing module 424 may be configured to compare, in response to implementing, the new call transcript data with the predefined complaint data; the generating module 426 may be configured to generate a second similarity score, based on comparing, that identifies how similar the new call transcript data is compared to the predefined complaint data; and the identifying module 428 may be configured to automatically identify the new call transcript data as a second dissatisfaction data based on determining that the second similarity score is equal to or more than the predetermined threshold value.

Figure 6:
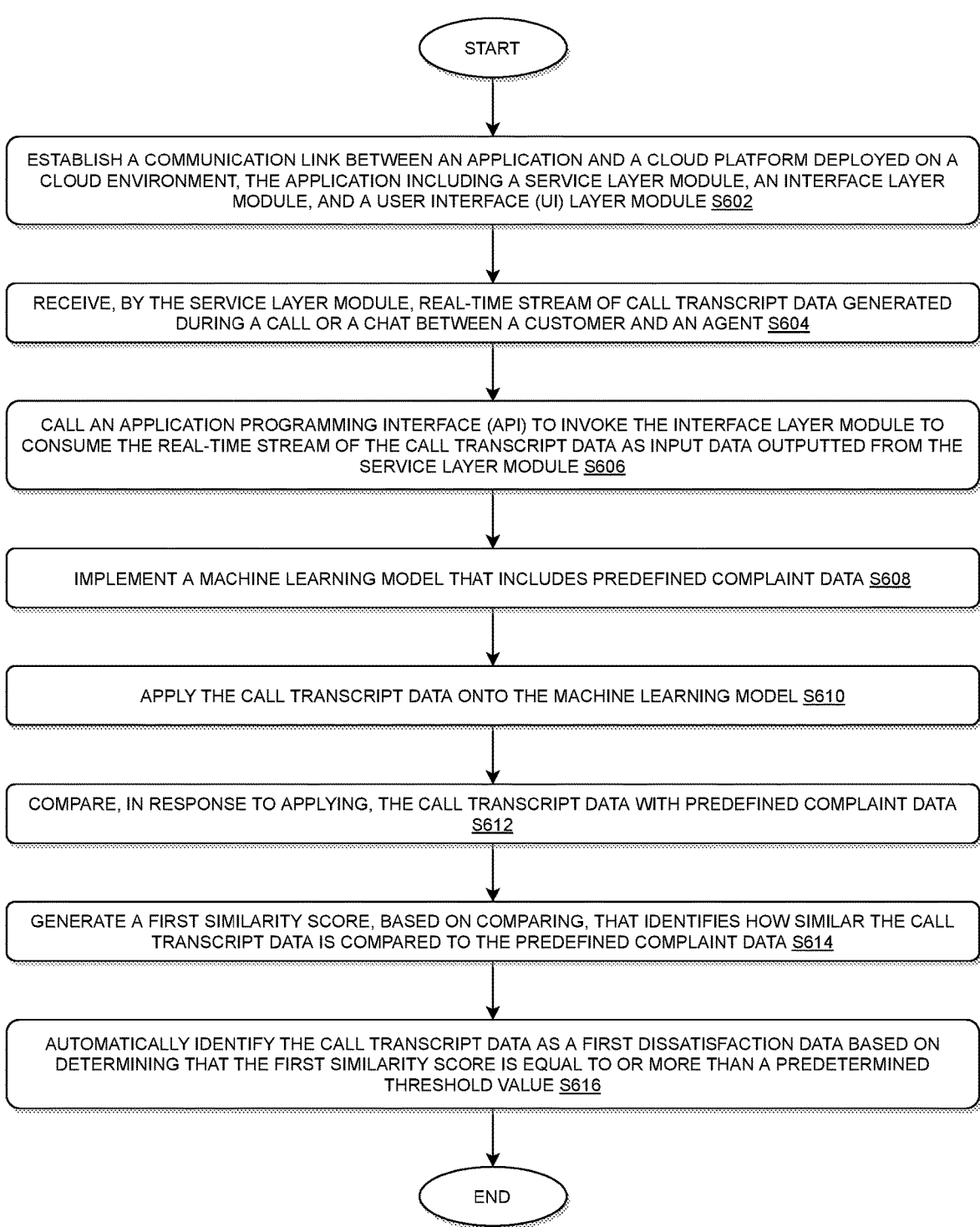
FIG. 6 illustrates an exemplary flow chart implemented by the platform and language agnostic dissatisfaction data identification module of FIG. 4 for automatically providing real-time identification of dissatisfaction data based on analyzing real-time received data stream of call transcript data in accordance with an exemplary embodiment.

FIG. 6 illustrates an exemplary flow chart 600 implemented by the DDIM 406 of FIG. 4 for automatic real-time identification of dissatisfaction data in accordance with an exemplary embodiment. It will be appreciated that the illustrated process 600 and associated steps may be performed in a different order, with illustrated steps omitted, with additional steps added, or with a combination of reordered, combined, omitted, or additional steps.

As illustrated in FIG. 6, at step S602, the process 600 may include establishing a communication link between an application and a cloud platform deployed on a cloud environment. The application may include a service layer module, an interface layer module, and a user interface (UI) layer module.

At step S604, the process 600 may include receiving, by the service layer module, real-time stream of call transcript data generated during a call or a chat between a customer and an agent.

At step S606, the process 600 may include calling an application programming interface (API) to invoke the interface layer module to consume the real-time stream of the call transcript data as input data outputted from the service layer module.

At step S608, the process 600 may include implementing a machine learning model that includes predefined complaint data.

At step S610, the process 600 may include applying the call transcript data onto the machine learning model.

At step S612, the process 600 may include comparing, in response to applying, the call transcript data with predefined complaint data.

At step S614, the process 600 may include generating a first similarity score, based on comparing, that identifies how similar the call transcript data is compared to the predefined complaint data.

At step S616, the process 600 may include automatically identifying the call transcript data as a first dissatisfaction data based on determining that the first similarity score is equal to or more than a predetermined threshold value.

According to exemplary embodiments, the call transcript data may include real-time stream of voice data received from a telephony device, and the process 600 may further include: converting the voice data into text data; and applying the text data onto the machine learning model.

According to exemplary embodiments, the call transcript data may include real-time stream of text data received from a chat platform, and the process 600 may further include: generating text data from the call transcript data; and applying the text data onto the machine learning model.

According to exemplary embodiments, the process 600 may further include: training the machine learning model with the first dissatisfaction data for automatic identification of a second dissatisfaction data and automatic identification of a second similarity score when a new call transcript data is received by the service layer module during a new call between the customer and the agent.

According to exemplary embodiments, in generating the call transcript data in real-time, the process 600 may further include: concatenating all utterances during the call between the customer and the agent; converting the utterances into text data; and applying the text data onto the machine learning model.

According to exemplary embodiments, in the process 600, the machine learning model may include one or more of the following models: a natural language processing (NLP) model and a long short term memory (LSTM) model, but the disclosure is not limited thereto.

According to exemplary embodiments, the process 600 may further include: storing output from the machine learning model onto a database.

According to exemplary embodiments, the process 600 may further include: automatically generating suggestions data based on the dissatisfaction data to resolve issues raised by the customer; and calling an API to invoke the UI interface layer module to display the suggestions data onto display screen of an agent computing device utilized by the agent.

According to exemplary embodiments, in the process 600, the suggestions data may include one or more of the following data: complaint data; policy data; types of complaint data; sub-types of complaint data; and de-escalation script data, but the disclosure is not limited thereto.

According to exemplary embodiments, the process 600 may further include: receiving agent feedback data on the complaint data from the agent's computing device; storing the agent feedback data onto a database; and consuming the agent feedback data by an analyst computing device utilized by an analyst.

According to exemplary embodiments, the process 600 may further include: training the machine learning model by applying the agent feedback data onto the machine learning model; receiving, by the service layer module, a new call or a new chat between the customer and the agent; implementing the trained machine learning model; comparing, in response to implementing, the new call transcript data with the predefined complaint data; generating a second similarity score, based on comparing, that identifies how similar the new call transcript data is compared to the predefined complaint data; and automatically identifying the new call transcript data as a second dissatisfaction data based on determining that the second similarity score is equal to or more than a predetermined threshold value.

According to exemplary embodiments, the predefined complaint data may logs of complaint data within an organization along with complaint data accessed from public database of complaints, and the process 600 may further include: training the machine learning model with the predefined complaint data.

According to exemplary embodiments, the DDID 402 may include a memory (e.g., a memory 106 as illustrated in FIG. 1) which may be a non-transitory computer readable medium that may be configured to store instructions for implementing a DDIM 406 for automatic real-time identification of dissatisfaction data as disclosed herein. The DDID 402 may also include a medium reader (e.g., a medium reader 112 as illustrated in FIG. 1) which may be configured to read any one or more sets of instructions, e.g., software, from any of the memories described herein. The instructions, when executed by a processor embedded within the DDIM 406 or within the DDID 402, may be used to perform one or more of the methods and processes as described herein. In a particular embodiment, the instructions may reside completely, or at least partially, within the memory 106, the medium reader 112, and/or the processor 104 (see FIG. 1) during execution by the DDID 402.

According to exemplary embodiments, the instructions, when executed, may cause a processor embedded within the DDIM 406 or the DDID 402 to perform the following: establishing a communication link between an application and a cloud platform deployed on a cloud environment, the application including a service layer module, an interface layer module, and a user interface (UI) layer module; receiving, by the service layer module, real-time stream of call transcript data generated during a call or a chat between a customer and an agent; calling an application programming interface (API) to invoke the interface layer module to consume the real-time stream of the call transcript data as input data outputted from the service layer module; implementing a machine learning model that includes predefined complaint data; applying the call transcript data onto the machine learning model; comparing, in response to applying, the call transcript data with predefined complaint data; generating a first similarity score, based on comparing, that identifies how similar the call transcript data is compared to the predefined complaint data; and automatically identifying the call transcript data as a first dissatisfaction data based on determining that the first similarity score is equal to or more than a predetermined threshold value. According to exemplary embodiments, the processor may be the same or similar to the processor 104 as illustrated in FIG. 1 or the processor embedded within DDID 202, DDID 302, DDID 402, and DDIM 406.

According to exemplary embodiments, the call transcript data may include real-time stream of voice data received from a telephony device, and the instructions, when executed, may further cause the processor 104 to perform the following: converting the voice data into text data; and applying the text data onto the machine learning model.

According to exemplary embodiments, the call transcript data may include real-time stream of text data received from a chat platform, and the instructions, when executed, may further cause the processor 104 to perform the following: generating text data from the call transcript data; and applying the text data onto the machine learning model.

According to exemplary embodiments, the instructions, when executed, may further cause the processor 104 to perform the following: training the machine learning model with the first dissatisfaction data for automatic identification of a second dissatisfaction data and automatic identification of a second similarity score when a new call transcript data is received by the service layer module during a new call between the customer and the agent.

According to exemplary embodiments, in generating the call transcript data in real-time, the instructions, when executed, may further cause the processor 104 to perform the following: concatenating all utterances during the call between the customer and the agent; converting the utterances into text data; and applying the text data onto the machine learning model.

According to exemplary embodiments, the instructions, when executed, may further cause the processor 104 to implement one or more of the following models: a natural language processing (NLP) model and a long short term memory (LSTM) model, but the disclosure is not limited thereto.

According to exemplary embodiments, the instructions, when executed, may further cause the processor 104 to perform the following: storing output from the machine learning model onto a database.

According to exemplary embodiments, the instructions, when executed, may further cause the processor 104 to perform the following: automatically generating suggestions data based on the dissatisfaction data to resolve issues raised by the customer; and calling an API to invoke the UI interface layer module to display the suggestions data onto display screen of an agent computing device utilized by the agent.

According to exemplary embodiments, the instructions, when executed, may further cause the processor 104 to display the suggestions data that may include one or more of the following data: complaint data; policy data; types of complaint data; sub-types of complaint data; and de-escalation script data, but the disclosure is not limited thereto.

According to exemplary embodiments, the instructions, when executed, may further cause the processor 104 to: receiving agent feedback data on the complaint data from the agent's computing device; storing the agent feedback data onto a database; and consuming the agent feedback data by an analyst computing device utilized by an analyst.

According to exemplary embodiments, the instructions, when executed, may further cause the processor 104 to: training the machine learning model by applying the agent feedback data onto the machine learning model; receiving, by the service layer module, a new call or a new chat between the customer and the agent; implementing the trained machine learning model; comparing, in response to implementing, the new call transcript data with the predefined complaint data; generating a second similarity score, based on comparing, that identifies how similar the new call transcript data is compared to the predefined complaint data; and automatically identifying the new call transcript data as a second dissatisfaction data based on determining that the second similarity score is equal to or more than a predetermined threshold value.

According to exemplary embodiments, the predefined complaint data may logs of complaint data within an organization along with complaint data accessed from public database of complaints, and the instructions, when executed, may further cause the processor 104 to: training the machine learning model with the predefined complaint data.

According to exemplary embodiments, real-time identification classifier (model) information may include model description, model testing and training information, model performance and model input, but the disclosure is not limited thereto.

An exemplary pseudocode for transcribing utterances may include the following:

```
{
  "namespace": "com.company.servicing.account_maintenance",
  "type": "record",
  "name": "UtteranceTranscribed",
  "version": 1,
  "fields": [
    {"name": "utteranceStartTimestamp", "type": "long", "doc": "Specifies when the utterance began"},
```

-continued

```
    {"name": "utteranceEndTimestamp", "type": "long", "doc": "Specifies when the
utterance ended"},
    {"name": "utteranceText", "type": "string", "doc": "The transcribed utterance
text"},
    {"name": "speakerType", "type": "int", "doc": "Indicates whether the speaker is
the agent (1) or the customer (0)"},
    {"name": "utteranceNumber", "type": "int", "doc": "Identifies the utterance
segment within the entire conversation"},
    {"name": "callConnectionIdentifier", "type": "string", "doc": "Identifies the
customer call within Genesys"},
    {"name": "sessionIdentifier", "type": "string", "doc": "Identifies the agent
session"}
  ]
}
```

An exemplary pseudocode for model output may include the following:

```
{
  "namespace": "com.company.servicing.account_maintenance",
  "type": "record",
  "name": "ModelPredictionGenerated",
  "version": 1,
  "fields": [
    {"name": "modelstartTimestamp", "type": "long", "doc": "Specifies when the
model prediction work began"},
    {"name": "modelEndTimestamp", "type": "long", "doc": "Specifies when the
model completed the prediction"},
    {"name": "modelInput", "type": "string", "doc": "The input being passed into
the model"},
    {"name": "modelOutput", "type": "string", "doc": "The entire model output
object"},
    {"name": "speakerType", "type": "int", "doc": "Indicates whether the speaker is
the agent (1) or the customer (0)"},
    {"name": "callConnectionIdentifier", "type": "string", "doc": "Identifies the
customer call within Genesys"}
  ]
}
```

An exemplary pseudocode for real-time capture of complaint may include the following:

```
{
  "namespace": "com.company.servicing.complaint_issue_resolution",
  "type": "record",
  "name": "RealtimeComplaintCaptured",
  "version": 2,
  "fields": [
    {"name": "call_connection_identifier", "type": "string", "doc": "Identifies the
customer call within Genesys"},
    {"name": "utterance_start_timestamp", "type": "long", "doc": "Specifies the
date and time when the utterance began"},
    {"name": "utterance_end_timestamp", "type": "long", "doc": "Specifies the
date and time when the utterance ended"},
    {"name": "speaker_type", "type": "int", "doc": "Indicates whether the speaker
is the agent (1) or the customer (0)"},
    {"name": "utterance_number", "type": "int", "doc": "Identifies the utterance
segment within the entire conversation"},
    {"name": "call_session_identifier", "type": "string", "doc": "Identifies the agent
session"},
    {"name": "create_date", "type": "string", "doc": "Specifies the date when model
output was created"},
    {"name": "create_user_identifier", "type": "string", "doc": "Specifies user
running prediction model"},
    {"name": "prediction_type_name", "type": "string", "doc": "Indicates the type
of machine learning model making the prediction"},
    {"name": "prediction_type_version_number", "type": "string", "doc":
"Indicates the version of the machine learning model making the prediction"},
    {"name": "prediction_result_value_json_text", "type": "string", "doc":
"Contains the entire model output object"}
  ]
}
```

According to exemplary embodiments, in the servicing block 505 illustrated in FIG. 5, the environment may be development/testing/production environment; database for storing transcripts data may be Cassandra or Keyspace; table name may be transcriptions. complaints_model_output; and details may include:

```
CREATE TABLE IF NOT EXISTS
transcriptions.complaints_model_output (
call_connection_identifier text,
call_session_identifier text,
utterance_number int,
speaker_type_code int,
create_timestamp timestamp,
create_user_identifier text,
prediction_type_name text,
prediction_type_version_number text,
prediction_result_value_json_text text, create_date text,
PRIMARY KEY ((call_connection_identifier, call_session_identifier),
utterance_number)
) WITH CLUSTERING ORDER BY (utterance_number ASC)
AND default_time_to_live= 8640000;
CREATE INDEX IF NOT EXISTS asofdate
ON transcriptions.complaints_model_output (create_date).
```

According to exemplary embodiments as disclosed above in FIGS. 1-6, technical improvements effected by the instant disclosure may include a platform for implementing a platform and language agnostic dissatisfaction data identification module that may be configured for automatically providing real-time identification of dissatisfaction data based on analyzing real-time received data stream of call transcript data, but the disclosure is not limited thereto. For example, according to exemplary embodiments as disclosed above in FIGS. 1-6, technical improvements effected by the instant disclosure may include a platform for implementing a platform and language agnostic dissatisfaction data identification module that may be configured for implementing machine learning algorithm to identify customer complaints data in real time while the customer is talking or chatting to agents to alleviate burden on agents, improve accuracy and achieve greater customer satisfaction, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for automatic real-time identification of dissatisfaction data by utilizing one or more processors along with allocated memory, the method comprising:

establishing a communication link between an application and a cloud platform deployed on a cloud environment, the application including a service layer module, an interface layer module, and a user interface (UI) layer module;

receiving, by the service layer module, real-time stream of call transcript data generated during a call or a chat between a customer and an agent;

calling an application programming interface (API) to invoke the interface layer module to consume the real-time stream of the call transcript data as input data outputted from the service layer module;

implementing a machine learning model that includes predefined complaint data;

concatenating all utterances during the call between the customer and the agent prior to applying the machine learning model;

receiving the call transcript data at the machine learning model;

processing the call transcript data using the machine learning model, the processing comprising:

comparing the call transcript data with one or more relevant portions of the predefined complaint data; and generating a first similarity score, based on the comparing, that identifies how similar the call transcript data is compared to the predefined complaint data;

automatically identifying the call transcript data as a first dissatisfaction data based on determining that the first similarity score is equal to or more than a predetermined threshold value, wherein the first dissatisfaction data is included as an updated portion of the predefined complaint data;

updating the machine learning model, the updating comprising:

training the machine learning model with at least the updated portion of the predefined complaint data for automatic identification of additional dissatisfaction data and automatic identification of additional similarity score, wherein the additional similarity score is derived from a new call transcript data, as received by the service layer module during a new call between one or more customers and one or more agents of a set of agents; and updating the predetermined threshold value in response to the training;

after the updating of the machine learning model, receiving one or more additional call transcript data at the machine learning model;

generating, using the machine learning model, an additional similarity score for each of the one or more additional call transcript data, based on individually comparing each of the additional call transcript data to the predefined complaint data, wherein the comparing identifies how similar each of the additional call transcript data is compared to the predefined complaint data;

automatically identifying the at least one of the one or more additional call transcript data as additional dissatisfaction data based on determining that the additional similarity score is equal to or more than the predetermined threshold value, wherein the additional dissatisfaction data is included as part of the updated portion of the predefined complaint data for further updating of the machine learning model;

automatically generating suggestions data that includes complaint data based on the dissatisfaction data to resolve issues raised by the customer;

calling an API to invoke the UI layer module to display the suggestions data onto display screen of an agent computing device utilized by the agent;

receiving agent feedback data on the complaint data from the agent computing device;

storing the agent feedback data onto a database;

consuming the agent feedback data by an analyst computing device utilized by an analyst;

training the machine learning model by applying the agent feedback data onto the machine learning model;

receiving, by the service layer module, the new call or a new chat between the customer and the agent;

implementing the trained machine learning model; and comparing, in response to the implementing, the new call transcript data with the predefined complaint data to generate the additional similarity score.

2. The method according to claim 1, wherein the call transcript data includes real-time stream of voice data received from a telephony device, and the method further comprising:

converting the voice data into text data; and receiving the text data at the machine learning model.

3. The method according to claim 1, wherein the call transcript data includes real-time stream of text data received from a chat platform, and the method further comprising:

generating text data from the call transcript data; and receiving the text data at the machine learning model.

4. The method according to claim 1, in generating the call transcript data in real-time, the method further comprising:

concatenating all utterances during the call between the customer and the agent;

converting the utterances into text data; and receiving the text data at the machine learning model.

5. The method according to claim 1, wherein the machine learning model includes one or more of the following models: a natural language processing (NLP) model and a long short term memory (LSTM) model.

6. The method according to claim 5, further comprising: storing output from the machine learning model onto a database.

7. The method according to claim 1, wherein the suggestions data further includes policy data and de-escalation script data.

8. The method according to claim 1, wherein the predefined complaint data includes historical logs of complaint data within an organization along with complaint data accessed from public database of complaints, and the method further comprising:

training the machine learning model with the predefined complaint data.

9. A system for automatic real-time identification of dissatisfaction data, the system comprising:

a processor; and a memory operatively connected to the processor via a communication interface, the memory storing computer readable instructions, when executed, causes the processor to:

establish a communication link between an application and a cloud platform deployed on a cloud environment, the application including a service layer module, an interface layer module, and a user interface (UI) layer module;

cause the service layer module to receive real-time stream of call transcript data generated during a call or a chat between a customer and an agent;

call an application programming interface (API) to invoke the interface layer module to consume the real-time stream of the call transcript data as input data outputted from the service layer module;

implement a machine learning model that includes predefined complaint data;

concatenate all utterances during the call between the customer and the agent prior to applying the machine learning model;

receive the call transcript data at the machine learning model;

process the call transcript data using the machine learning model, the processing comprising:

compare the call transcript data with one or more relevant portions of the predefined complaint data; and generate a first similarity score, based on the comparing, that identifies how similar the call transcript data is compared to the predefined complaint data;

automatically identify the call transcript data as a first dissatisfaction data based on determining that the first similarity score is equal to or more than a predetermined threshold value, wherein the first dissatisfaction data is included as an updated portion of the predefined complaint data;

update the machine learning model, the update comprising:

train the machine learning model with at least the updated portion of the predefined complaint data for automatic identification of additional dissatisfaction data and automatic identification of additional similarity score, wherein the additional similarity score is derived from a new call transcript data, as received by the service layer module during a new call between one or more customers and one or more agents of a set of agents; and update the predetermined threshold value in response to the training;

after the updating of the machine learning model, receive one or more additional call transcript data at the machine learning model;

generate, using the machine learning model, an additional similarity score for each of the one or more additional call transcript data, based on individually comparing each of the additional call transcript data to the predefined complaint data, wherein the comparing identifies how similar each of the additional call transcript data is compared to the predefined complaint data;

automatically identify the at least one of the one or more additional call transcript data as additional dissatisfaction data based on determining that the additional similarity score is equal to or more than the predetermined threshold value, wherein the additional dissatisfaction data is included as part of the updated portion of the predefined complaint data for further updating of the machine learning model;

automatically generate suggestions data that includes complaint data based on the dissatisfaction data to resolve issues raised by the customer;

call an API to invoke the UI layer module to display the suggestions data onto display screen of an agent computing device utilized by the agent;

receive agent feedback data on the complaint data from the agent computing device;

store the agent feedback data onto a database;

consume the agent feedback data by an analyst computing device utilized by an analyst;

train the machine learning model by applying the agent feedback data onto the machine learning model;

receive, by the service layer module, the new call or a new chat between the customer and the agent;

implement the trained machine learning model; and compare, in response to the implementing, the new call transcript data with the predefined complaint data to generate the additional similarity score.

10. The system according to claim 9, wherein the call transcript data includes real-time stream of voice data received from a telephony device, and the processor is further configured to:

convert the voice data into text data; and receive the text data at the machine learning model.

11. The system according to claim 9, wherein the call transcript data includes real-time stream of text data received from a chat platform, and the processor is further configured to:

generate text data from the call transcript data; and receive the text data at the machine learning model.

12. The system according to claim 9, in generating the call transcript data in real-time, the processor is further configured to:

concatenate all utterances during the call between the customer and the agent;

convert the utterances into text data; and receive the text data at the machine learning model.

13. The system according to claim 9, wherein the suggestions data further includes policy data and de-escalation script data.

14. A non-transitory computer readable medium configured to store instructions for automatic real-time identification of dissatisfaction data, wherein, when executed, the instructions cause a processor to perform the following:

establishing a communication link between an application and a cloud platform deployed on a cloud environment, the application including a service layer module, an interface layer module, and a user interface (UI) layer module;

receiving, by the service layer module, real-time stream of call transcript data generated during a call or a chat between a customer and an agent;

calling an application programming interface (API) to invoke the interface layer module to consume the real-time stream of the call transcript data as input data outputted from the service layer module;

implementing a machine learning model that includes predefined complaint data;

concatenating all utterances during the call between the customer and the agent prior to applying the machine learning model;

receiving the call transcript data at the machine learning model;

processing the call transcript data using the machine learning model, the processing comprising:

comparing the call transcript data with one or more relevant portions of the predefined complaint data; and generating a first similarity score, based on the comparing, that identifies how similar the call transcript data is compared to the predefined complaint data;

automatically identifying the call transcript data as a first dissatisfaction data based on determining that the first similarity score is equal to or more than a predetermined threshold value, wherein the first dissatisfaction data is included as an updated portion of the predefined complaint data;

updating the machine learning model, the updating comprising:

training the machine learning model with at least the updated portion of the predefined complaint data for automatic identification of additional dissatisfaction data and automatic identification of additional similarity score, wherein the additional similarity score is derived from a new call transcript data, as is-received by the service layer module during a new call between one or more customers and one or more agents of a set of agents; and updating the predetermined threshold value in response to the training;

after the updating of the machine learning model, receiving one or more additional call transcript data at the machine learning model;

generating, using the machine learning model, an additional similarity score for each of the one or more additional call transcript data, based on individually comparing each of the additional call transcript data to the predefined complaint data, wherein the comparing identifies how similar each of the additional call transcript data is compared to the predefined complaint data;

automatically identifying the at least one of the one or more additional call transcript data as additional dissatisfaction data based on determining that the additional similarity score is equal to or more than the predetermined threshold value, wherein the additional dissatisfaction data is included as part of the updated portion of the predefined complaint data for further updating of the machine learning model;

automatically generating suggestions data that includes complaint data based on the dissatisfaction data to resolve issues raised by the customer;

calling an API to invoke the UI layer module to display the suggestions data onto display screen of an agent computing device utilized by the agent;

receiving agent feedback data on the complaint data from the agent computing device;

storing the agent feedback data onto a database;

consuming the agent feedback data by an analyst computing device utilized by an analyst;

training the machine learning model by applying the agent feedback data onto the machine learning model;

receiving, by the service layer module, the new call or a new chat between the customer and the agent;

implementing the trained machine learning model; and comparing, in response to the implementing, the new call transcript data with the predefined complaint data to generate the additional similarity score.

* * * * *